United States Patent
Alhaidar

(10) Patent No.: US 9,077,792 B1
(45) Date of Patent: Jul. 7, 2015

(54) EXPANDABLE MOBILE DEVICE

(71) Applicant: Mohammad T. A. J. Alhaidar, Nuzha Area (KW)

(72) Inventor: Mohammad T. A. J. Alhaidar, Nuzha Area (KW)

( * ) Notice: Subject to any disclaimer, the term of this patent is extended or adjusted under 35 U.S.C. 154(b) by 0 days.

(21) Appl. No.: 14/526,467

(22) Filed: Oct. 28, 2014

(51) Int. Cl.
 *G06F 15/16* (2006.01)
 *H04M 1/02* (2006.01)

(52) U.S. Cl.
 CPC .................................. *H04M 1/0266* (2013.01)

(58) Field of Classification Search
 USPC ................ 455/550.1, 552.1, 557, 566, 575.1, 455/575.3, 575.4; 361/679.01, 679.04
 See application file for complete search history.

(56) References Cited

U.S. PATENT DOCUMENTS

| | | |
|---|---|---|
| 6,643,124 B1 | 11/2003 | Wilk |
| 7,092,247 B2 | 8/2006 | Kim |
| D600,233 S | 9/2009 | Birsel et al. |
| 8,508,433 B2 | 8/2013 | Manning |
| 8,539,705 B2 | 9/2013 | Bullister |
| 8,606,340 B2 | 12/2013 | Pegg |
| 2004/0204126 A1 | 10/2004 | Reyes et al. |
| 2005/0096082 A1 | 5/2005 | Chang |
| 2007/0279315 A1 | 12/2007 | Laves et al. |
| 2010/0304793 A1 | 12/2010 | Kim et al. |
| 2011/0143769 A1* | 6/2011 | Jones et al. ................ 455/456.1 |
| 2012/0147599 A1 | 6/2012 | Shim et al. |
| 2013/0250492 A1 | 9/2013 | Wong et al. |
| 2013/0323947 A1* | 12/2013 | Lee et al. ...................... 439/131 |

OTHER PUBLICATIONS

"Samsung reveals a folding phone-to-tablet prototype," http://www.techradar.com/news/phone-and-communications/mobile-phones/samsung-reveals-a-folding-phone-to-tablet-prototype-1197384#null Tech Radar website.

* cited by examiner

*Primary Examiner* — Sam Bhattacharya
(74) *Attorney, Agent, or Firm* — Richard C Litman

(57) ABSTRACT

The expandable mobile device includes two or more detachable display devices or panels, each of which include display portions. The display devices can be stacked together such that a display portion of only one of the detachable display devices is exposed, or detachably connected along side edges such that the display portion of all of the display devices is exposed. When the display devices are disposed in the stacked configuration, the expandable mobile device can be used as a mobile phone or other compact, bar type electronic device. When the display devices are detachably connected along side edges to expose the display portion of the display devices, the expandable mobile device provides a larger display area and can be used as a tablet. Connector prongs disposed on one or more of the detachable display devices facilitate physical attachment and electrical interoperability of the display devices.

4 Claims, 14 Drawing Sheets

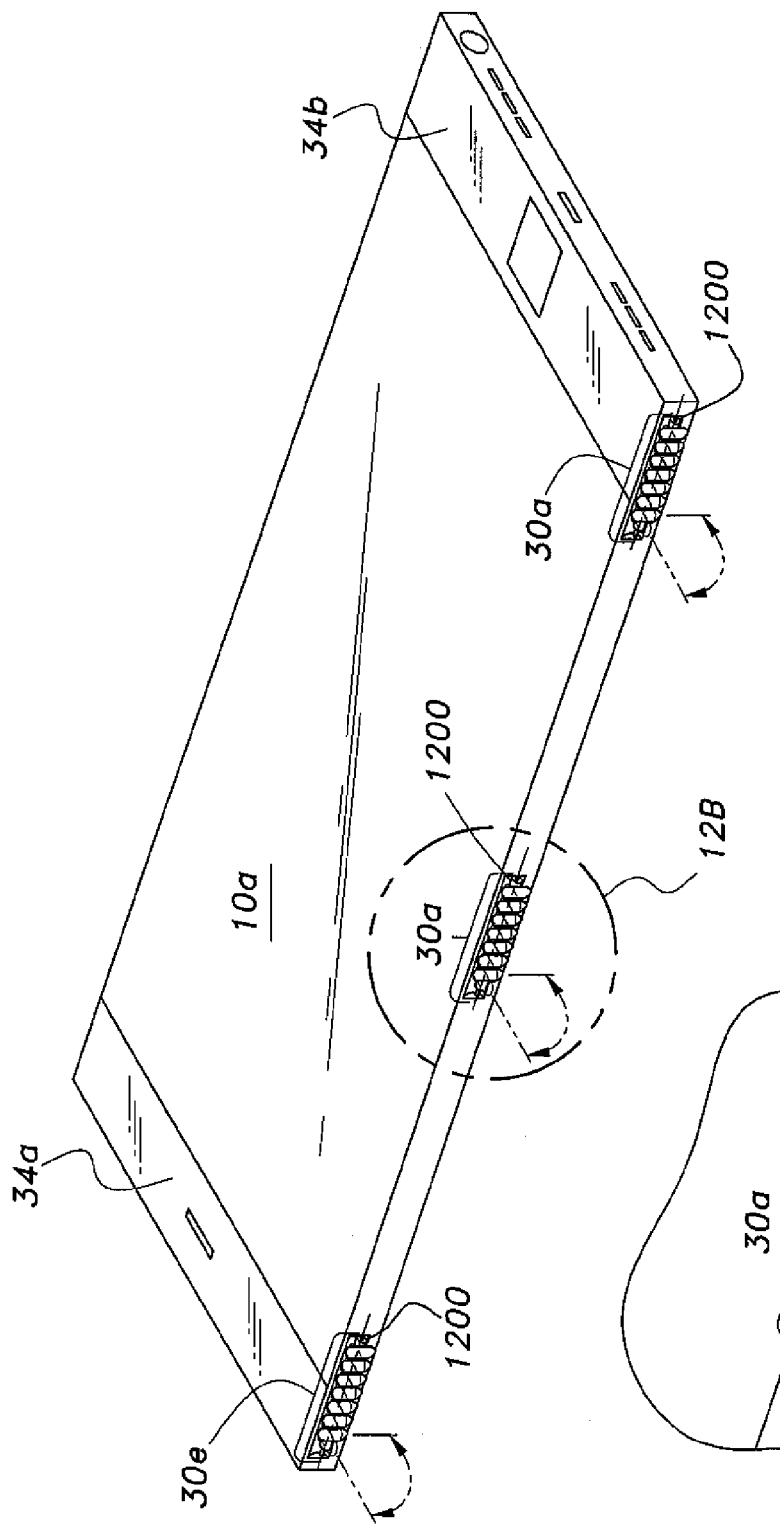

EXPANDABLE MOBILE DEVICE

BACKGROUND OF THE INVENTION

1. Field of the Invention

The present invention relates generally to electronic devices, and particularly to connectable electronic devices which provide the functionality of both smart phones and tablet devices depending on a user's preference.

2. Description of the Related Art

Mobile device display size is one of a variety of important features undergoing competition in the mobile device development field. Larger display sizes provide more eye relief and better productivity. However mobile devices are designed to be easily carried and easily placed in pockets or small carry bags. These requirements tend to limit how large a screen should be to maintain the best portability feature.

Tablets have larger displays thereby facilitating greater productivity than the typical mobile phone device. In addition, tablets are less cumbersome than laptops and much easier to power up and use. Tablets are effective for many applications such as watching videos, watching images, playing games or writing a report. But on the other hand, tablets are not a better option than mobile phones when it comes to portability.

While smaller electronic devices are increasingly formed, the opposite is true when it comes to televisions and PC monitors, since larger displays have the aforementioned advantages. For example, multi-screen technology has been developed for televisions and PC monitors. Such technology, however, has not been used for tablets and other mobile devices.

Thus, expandable mobile device solving the aforementioned problems are desired.

SUMMARY OF THE INVENTION

The expandable mobile device includes two or more detachable display devices or panels, each of which include display portions. The display devices can be stacked together such that a display portion of only one of the detachable display devices is exposed, or detachably connected along side edges such that the display portion of all of the display devices is exposed. When the display devices are disposed in the stacked configuration, the expandable mobile device can be used as a mobile phone or other compact, bar type electronic device. When the display devices are detachably connected along side edges, the display portion of all of the display devices is exposed and can be used simultaneously (multi-display mode). The expandable mobile device can thereby provide a larger display area and can be used as a tablet or other similar electronic device. Connector prongs disposed on one or more of the detachable display devices facilitate detachable connection of the display devices as well as the electrical interoperability of the display devices. The expandable mobile device further includes multi-display adapter technology for forming a larger display screen. Magnetic strips and/or clip buttons secure the display devices in the stack when not used in the multi-display mode. The expandable mobile device can provide important functionality, productivity and portability features of smart phones and tablets.

These and other features of the present invention will become readily apparent upon further review of the following specification and drawings.

BRIEF DESCRIPTION OF THE DRAWINGS

FIG. 12A is a perspective view of a detachable display panel of the embodiment of FIG. 1, having a group of retractable/extendable electrical connecting prongs, according to the present invention.

FIG. 12B is an enlarged view of the retractable/extendable electrical connecting prongs of FIG. 12A, according to the present invention.

Similar reference characters denote corresponding features consistently throughout the attached drawings.

DETAILED DESCRIPTION OF THE PREFERRED EMBODIMENTS

Figure 1:
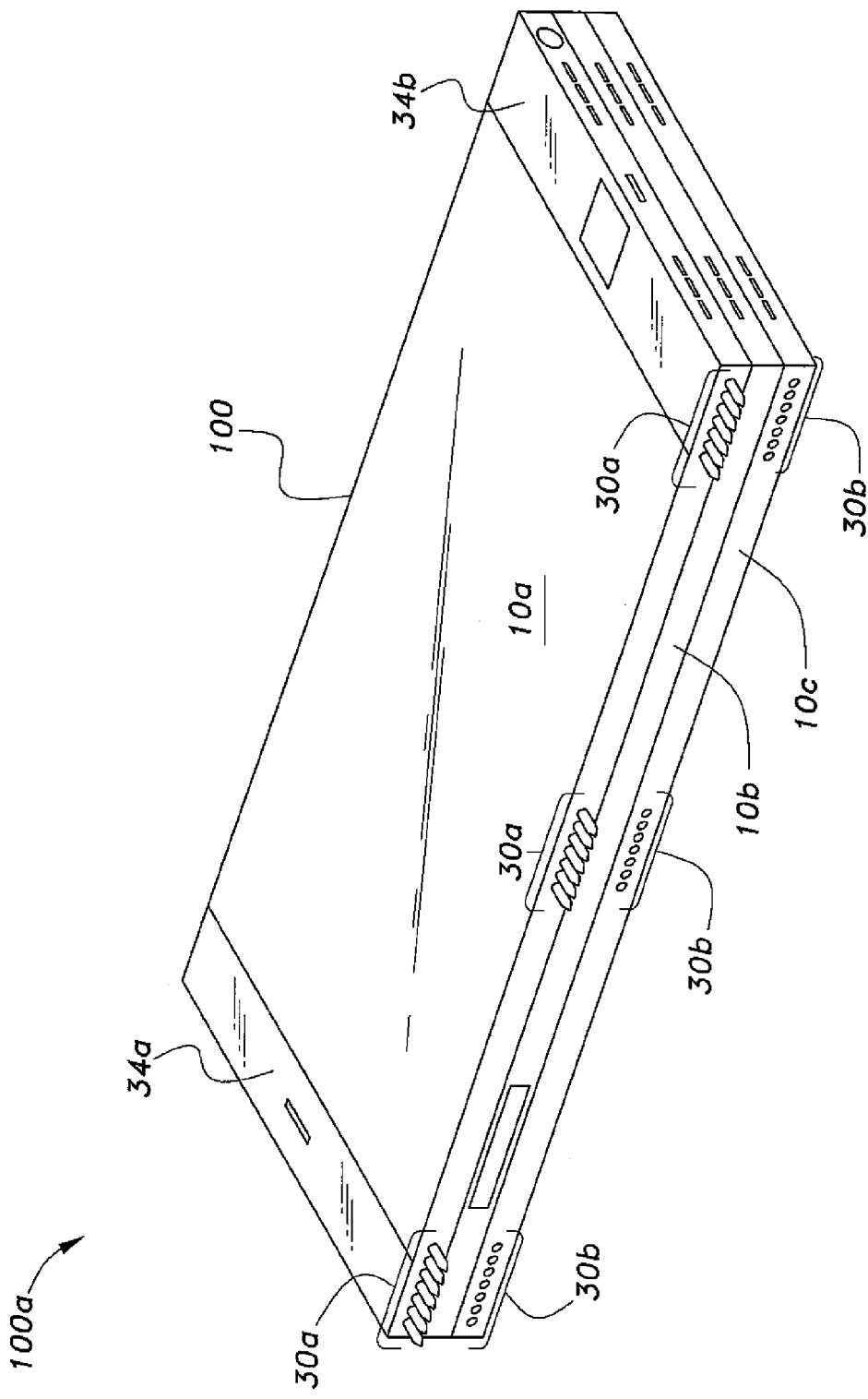
FIG. 1 is a perspective view of the expandable mobile device showing the device in a compact configuration, according to the present invention.
Figure 2:
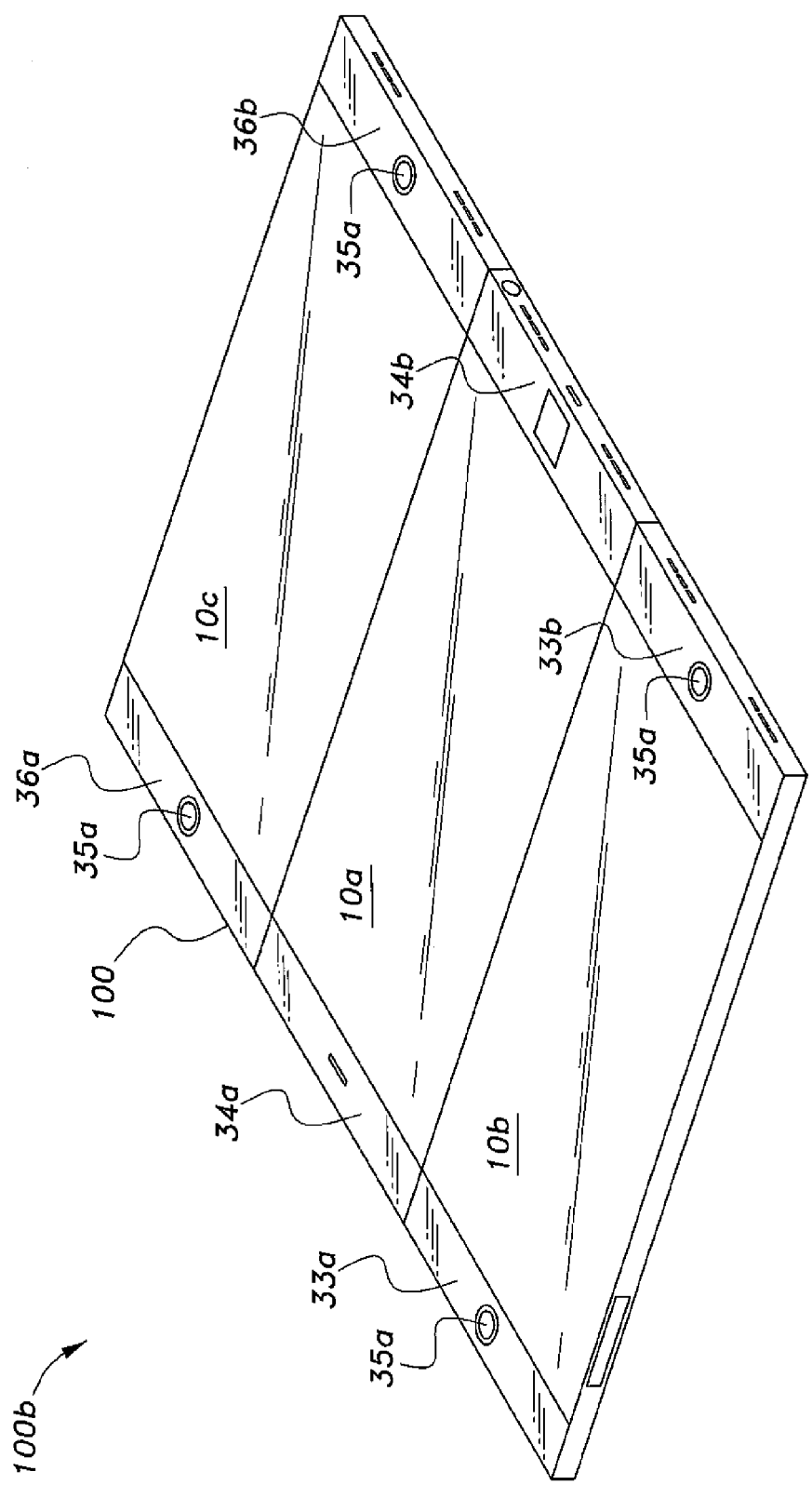
FIG. 2 is a perspective view of the expandable mobile device showing the device in a large display configuration, according to the present invention.

As shown in FIGS. 1 and 2, the expandable mobile device 100 can include two or more electronic display devices or display panels with display portions, e.g., screens of the same or differing size. The display panels can include, for example, a first display panel 10a, a second display panel 10b, and a third display panel 10c, which are stackable on top of each other, or connectable along sides thereof. In the stacked or compact configuration 100a, shown in FIG. 1, the mobile device can be used as a cellular telephone, e.g., a smart phone, for which only the display portion of panel 10a is visible. When the panels 10a, 10b, and 10c are unstacked and operably connected together in a large display configuration 100b, the display portions of each of the panels 10a, 10b, and 10c can be used simultaneously to provide multi-display output. In such a configuration, the expandable mobile device can be used as a tablet or large screen smartphone, for example. It should be understood that the screen or display portion of each of the panels can vary in size. For example, the size of the display portion of each of the panels can range from about two to six inches diagonal.

The mobile device can be a two-way communication device with advanced data communication capabilities, e.g., having the capability to communicate with other computer systems. The mobile device can include the capability for voice communications. For example, the mobile device can be a cellular telephone with data messaging capabilities, a wireless Internet appliance, and/or a data communication device. The mobile device, preferably panel 10a, can include a microprocessor, a communications subsystem, and other components known in the art.

Each of the display panels 10a, 10b, and 10c can include a housing equipped with magnetic surfaces, e.g., ferromagnetic and/or paramagnetic surfaces, in order to create a magnetic bond that can retain the devices in a narrow profile stack when the devices are stacked together, e.g., in the compact configuration shown in FIG. 1. For example, referring to FIG. 2, panel 10b may have a permanently magnetized top portion 33a and a permanently magnetized bottom portion 33b. Display panel 10a may have a steel or other paramagnetic top portion 34a and a steel or other paramagnetic bottom portion 34b. Display panel 10c may have a steel or other paramagnetic top portion 36a and a steel or other paramagnetic bottom portion 34b. It should be understood that the panels 10a-10c can include a combination of ferromagnetic and paramagnetic surfaces or, for example, magnetic surfaces that are substantially one hundred percent ferromagnetic and substantially zero percent paramagnetic surfaces, as long as the ferromagnetic surfaces are disposed on the panels in a manner and orientation that successfully implements the aforementioned magnetic bonding between the panels.

Figure 11A:
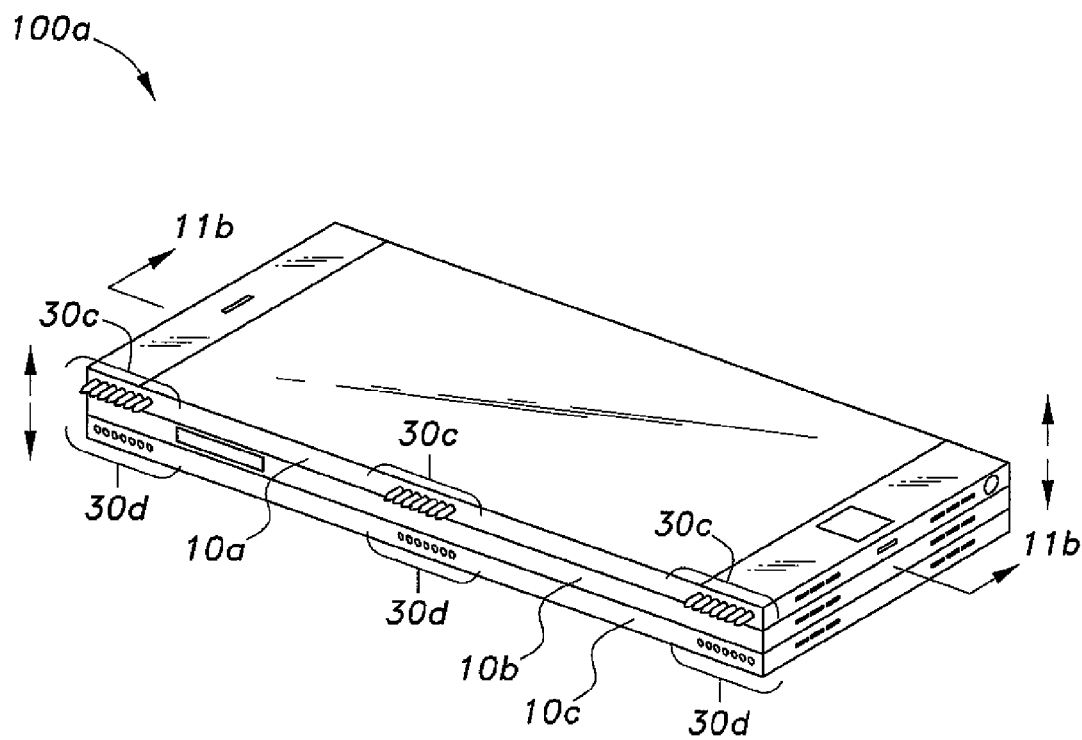
FIG. 11A is a perspective view of the embodiment of FIG. 1, showing cut line 11b.
Figure 11B:
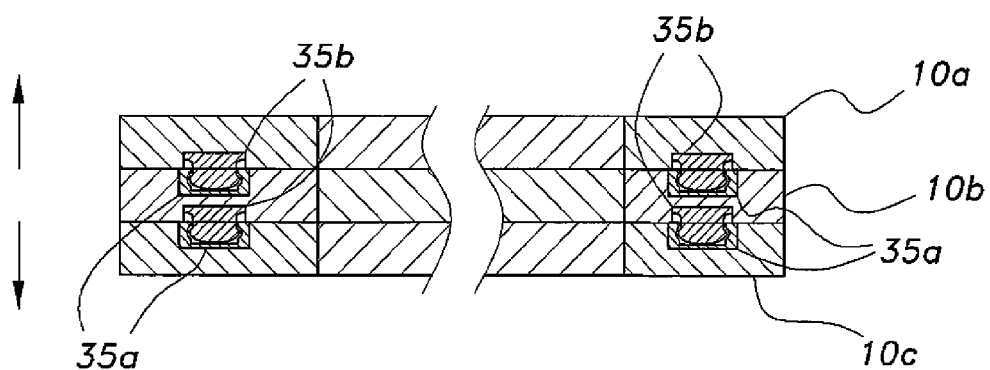
FIG. 11B is a section view as seen from the line 11b of FIG. 1, showing the snap fit connectors of the display panels, according to the present invention.

Additionally, as most clearly shown in FIGS. 11A and 11B, receptive snap fit members 35a and insertive snap fit members 35b can be disposed in the housing of middle panel 10b in the stack, e.g., opposing sides of middle device 10b. For example, insertive snap fit members 35b can be disposed in the housing of the top panel 10a of the stack. Receptive snap fit members 35a can be disposed in the housing of bottom panel 10c of the stack. The configuration of snap fit members shown in FIG. 11B allows the panels to be buttoned together to form a stack as shown in FIG. 11A. The insertive snap fit members 35b snap and lock into the receptive snap fit members 35a to retain the panels 10a, 10b, and 10c co-aligned in the stacked configuration 100a.

Edge portions of panels 10a, 10b and 10c may include ferromagnetic or paramagnetic surfaces in order to create a magnetic bond that can aid in retaining the panels in the large display configuration 100b. For example, referring to FIGS. 3, 4A and 4B, panel 10a may have at least one permanently magnetized edge 33c, panel 10b may have at least one steel or other paramagnetic edge, and panel 10c may have at least one steel or other paramagnetic edge 34c. Accordingly, magnetic bonding of panels 10a and 10b and panels 10a and 10c is thereby facilitated when the magnetized edges of the panels are aligned in the large display configuration 100b (shown in FIG. 2).

As shown in FIGS. 12A and 12B, the electrical connecting prongs 30a can be pivotally disposed, via pivot pin 1200, on the housing of panel 10a, thereby allowing the prongs 30e to be pivotally adjusted. The prongs 30a can also be retracted inward within the housing to a stowed configuration when the panel 10a is not being used in a multi-display mode. In an operational configuration, the prongs 30a extend from at least one side of the housing when the panel 10a is ready to be plugged in to other panels for use in the multi-display mode.

Figure 3:
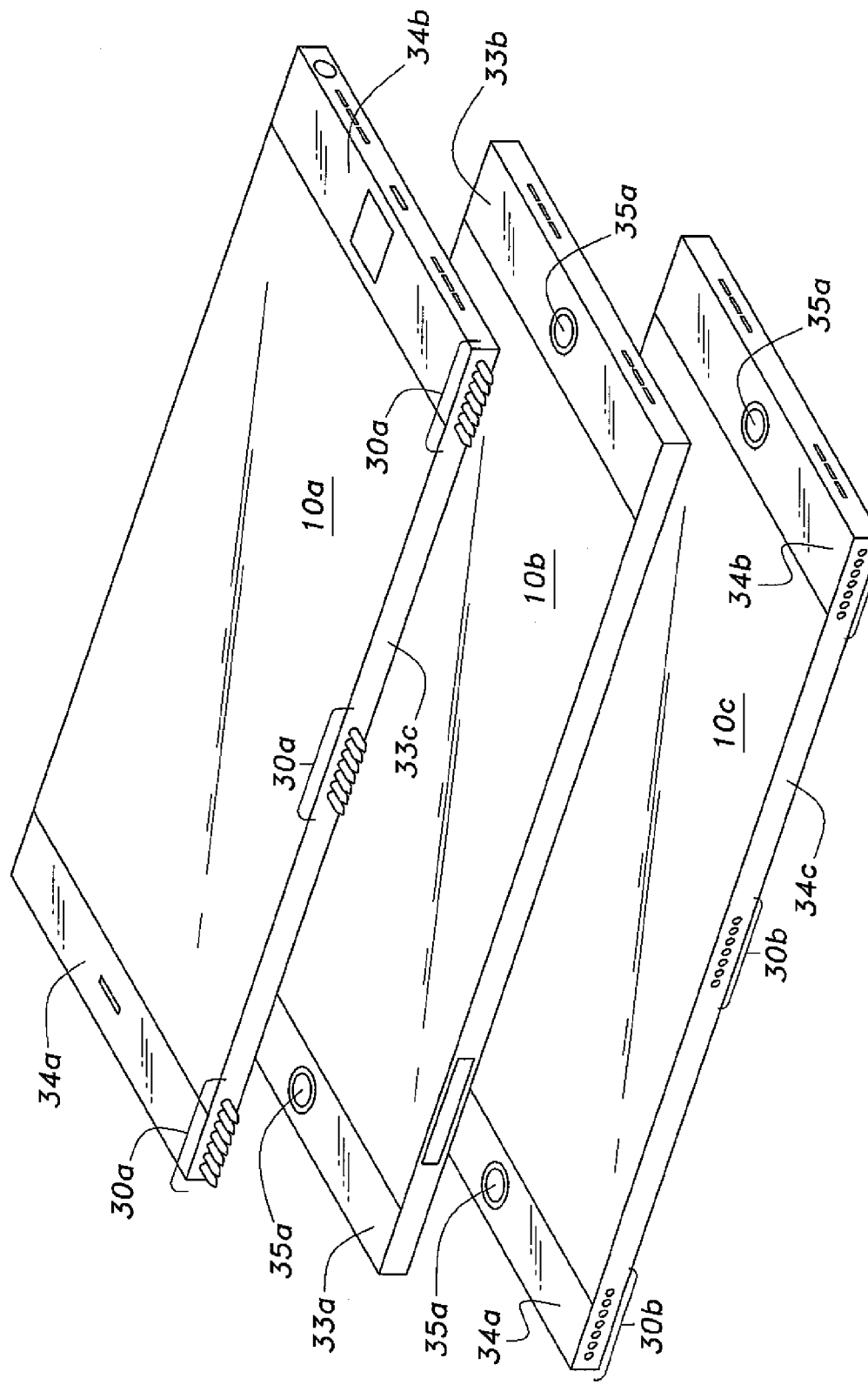
FIG. 3 is an exploded perspective view of the expandable mobile device of FIGS. 1 and 2, according to the present invention.
Figure 4A:
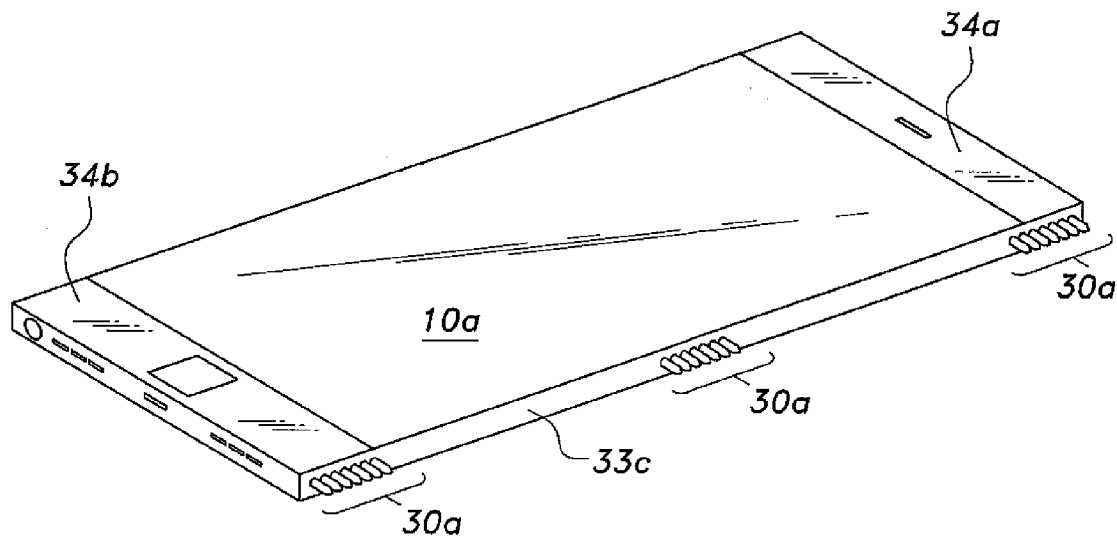
FIG. 4A is a perspective view of panel 10a showing the connector prongs, according to the present invention.
Figure 4B:
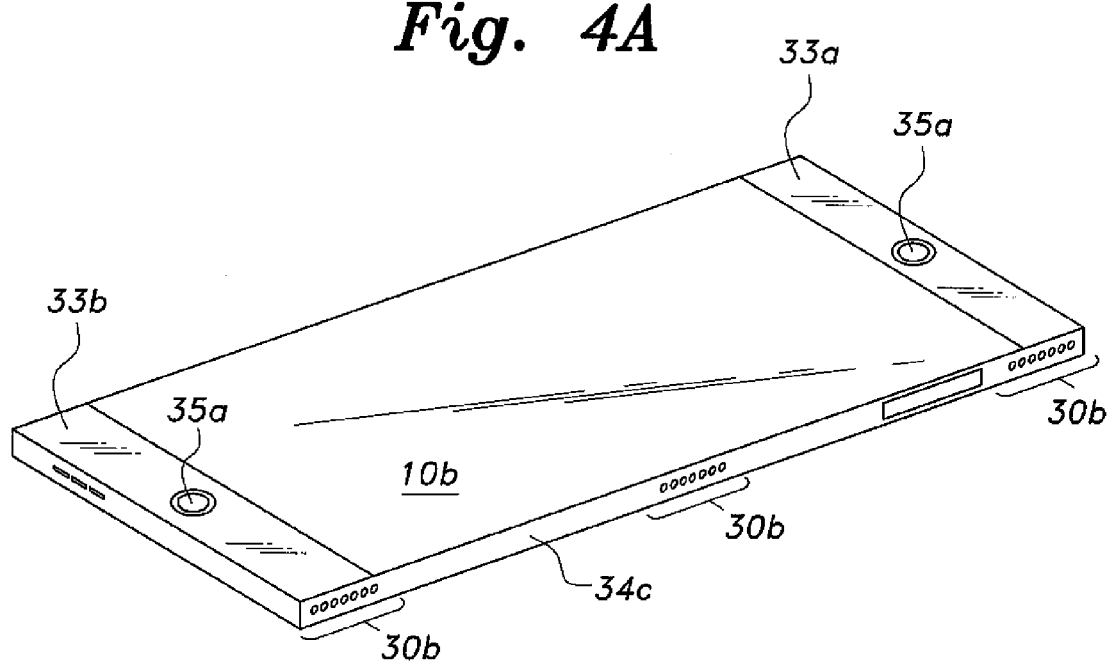
FIG. 4B is a perspective view of panel 10b showing the connector sockets according to the present invention.

As shown in FIGS. 1 through 3, the housing of panel 10a has a first group of electrical connecting prongs 30a disposed thereon and extending from at least one side, e.g., opposing sidewalls of the housing. As shown in FIGS. 3 and 4A, the first group of electrical connecting prongs can extend from opposing sides of the panel 10a. As most clearly shown in FIG. 4B, the housing of panel 10b has sockets 30b disposed on at least one side thereof. The sockets 30b can be configured for receiving the first group of prongs 30a extending from a first side of panel 10a to provide multi-display functionality between panel 10b and panel 10a when the two panels are mated as shown in FIG. 2. Each socket may have multiple receiving holes. Similarly, panel 10c has sockets 30b disposed on at least one side of its housing, the sockets 30b being configured for receiving the first group of prongs 30a extending from a second, opposing side of panel 10a to provide multi-display functionality between panel 10c and panel 10a when the two panels are mated as shown in FIG. 2.

Figure 13:
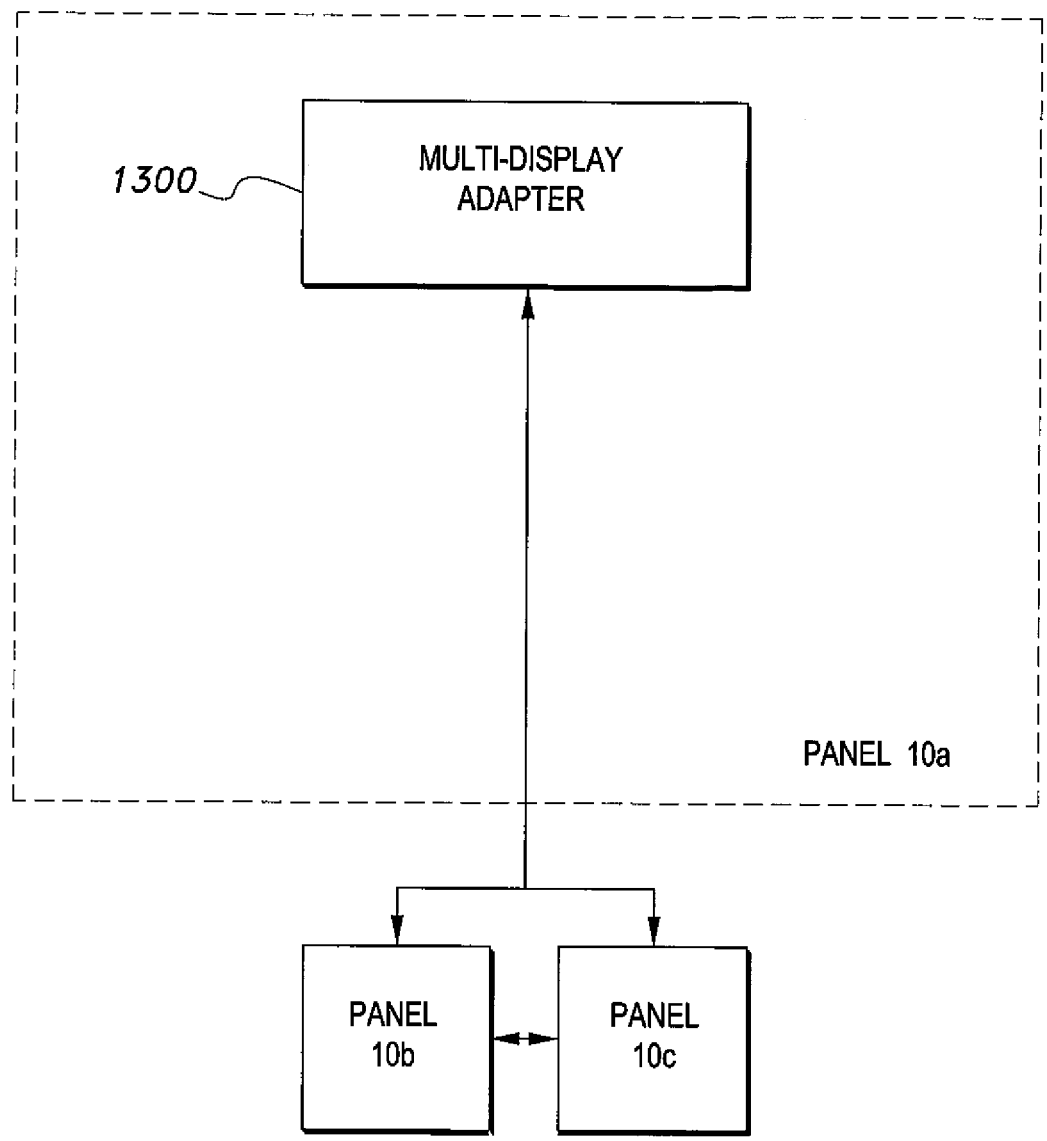
FIG. 13 is a block diagram showing the multi-display adapter connectivity according to the present invention.

It should be understood that when in the large display configuration 100b, the multi-display mode can function across all of the panels 10a, 10b, and 10c. In other words, panels 10a, 10b, and 10c can be used simultaneously. The expandable mobile device 100 can include a multi-display adapter (similar to the multi-screen technology commonly used for televisions and PC monitors) that is internal to at least one of the panels 10a, 10b, and 10c. For example, as shown in FIG. 13, the multi-display adapter 1300 can be internal to panel 10a and operably connected to panels 10b and 10c to combine the display operations of the panels 10a 10b and 10c to provide multi-display output.

Figure 5:
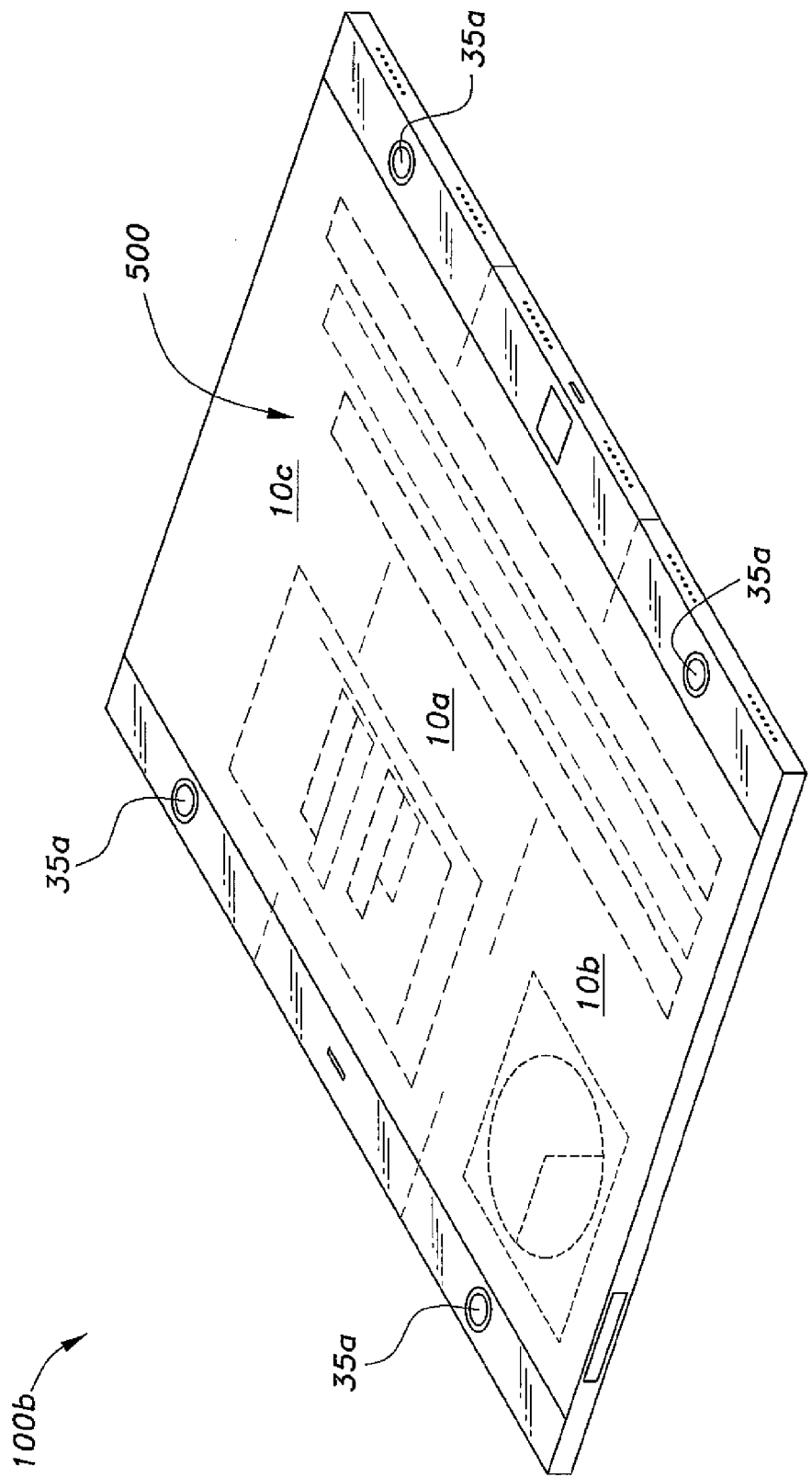
FIG. 5 is a perspective view of the expandable mobile device, showing a single application on the display panels, according to the present invention.

As shown in FIG. 5, the multi-display electronic panels 10a, 10b, and 10c in the large display configuration 100b can display a single large image application 500, or the like. For example, the display portions of at least two of the panels 10a, 10b, and 10c, can be employed together to form one complete, continuous display or screen on a level surface.

Figure 6:
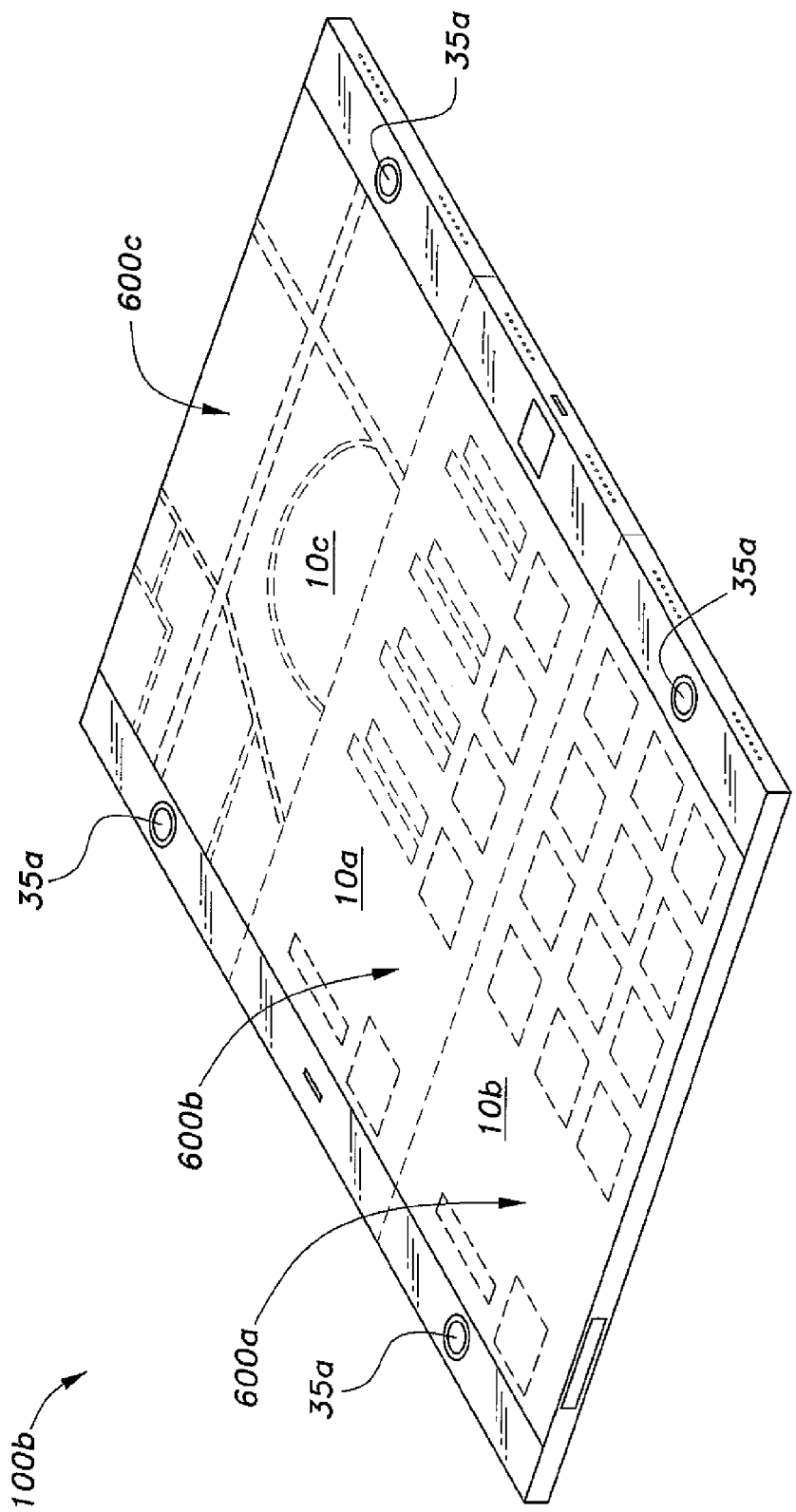
FIG. 6 is a perspective view of the expandable mobile device, showing multiple applications on the display panels, according to the present invention.

Alternatively, as shown in FIG. 6, the multi-display electronic panels 10a, 10b, and 10c in the large display configuration 100b can present distinct application displays 600a, 600b, and 600c. For example, a user may view a web page on one display screen, while viewing an email message on a second display screen and composing an email message on a third display screen. Internal display adapter options can be set by the application software or the user to determine whether the single large image application 500 or the distinct application displays 600a, 600b, and 600c are active. When the distinct application displays are active, the user can use more than one application at a time, thereby increasing productivity on the devices 10a, 10b, and 10c.

Figure 7A:
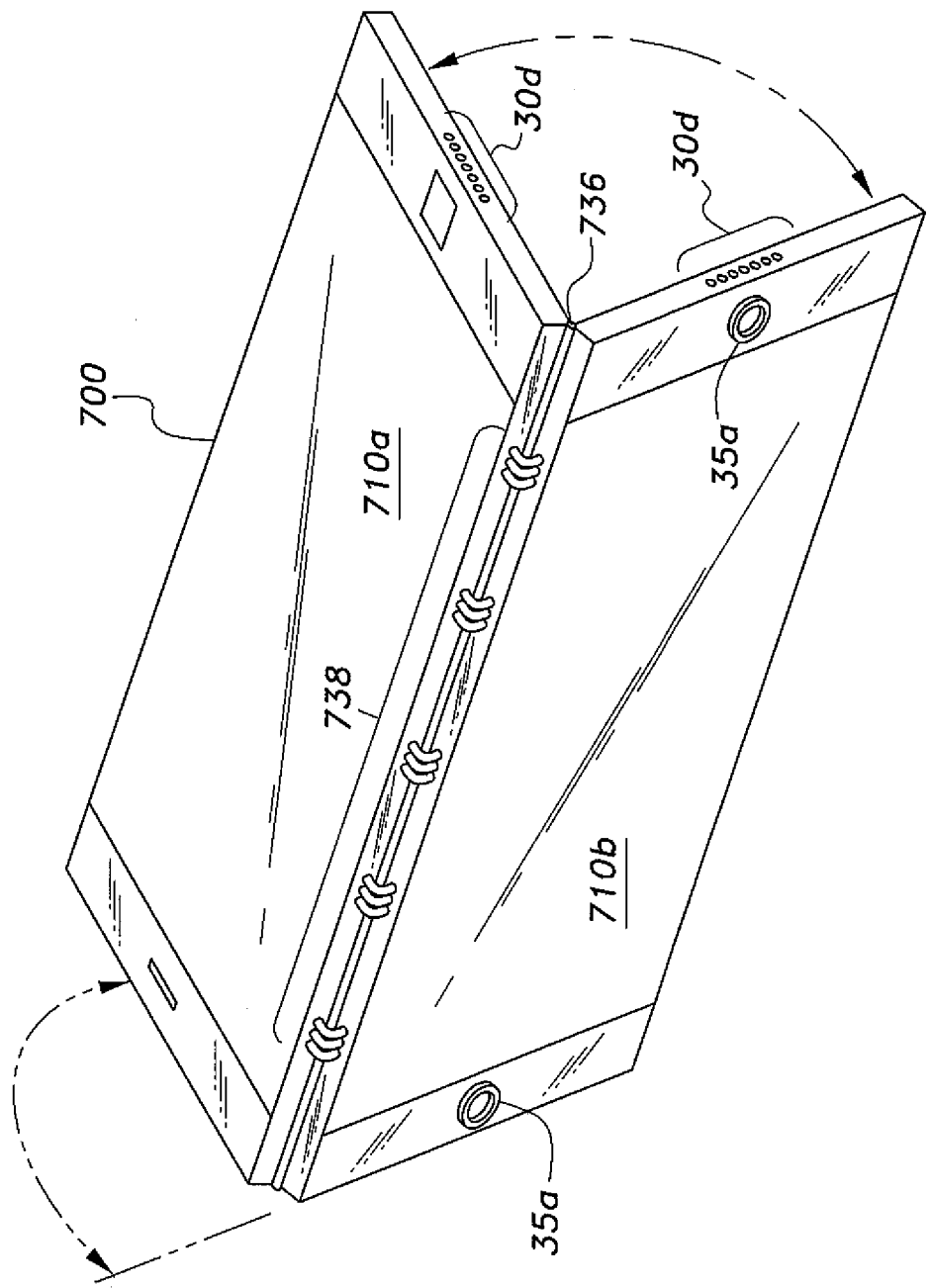
FIG. 7A is a perspective view of the expandable mobile device, showing pivotal attachment of the side-by-side display panels and electrical connecting sockets for receiving the top mounted display panel, according to the present invention.
Figure 7B:
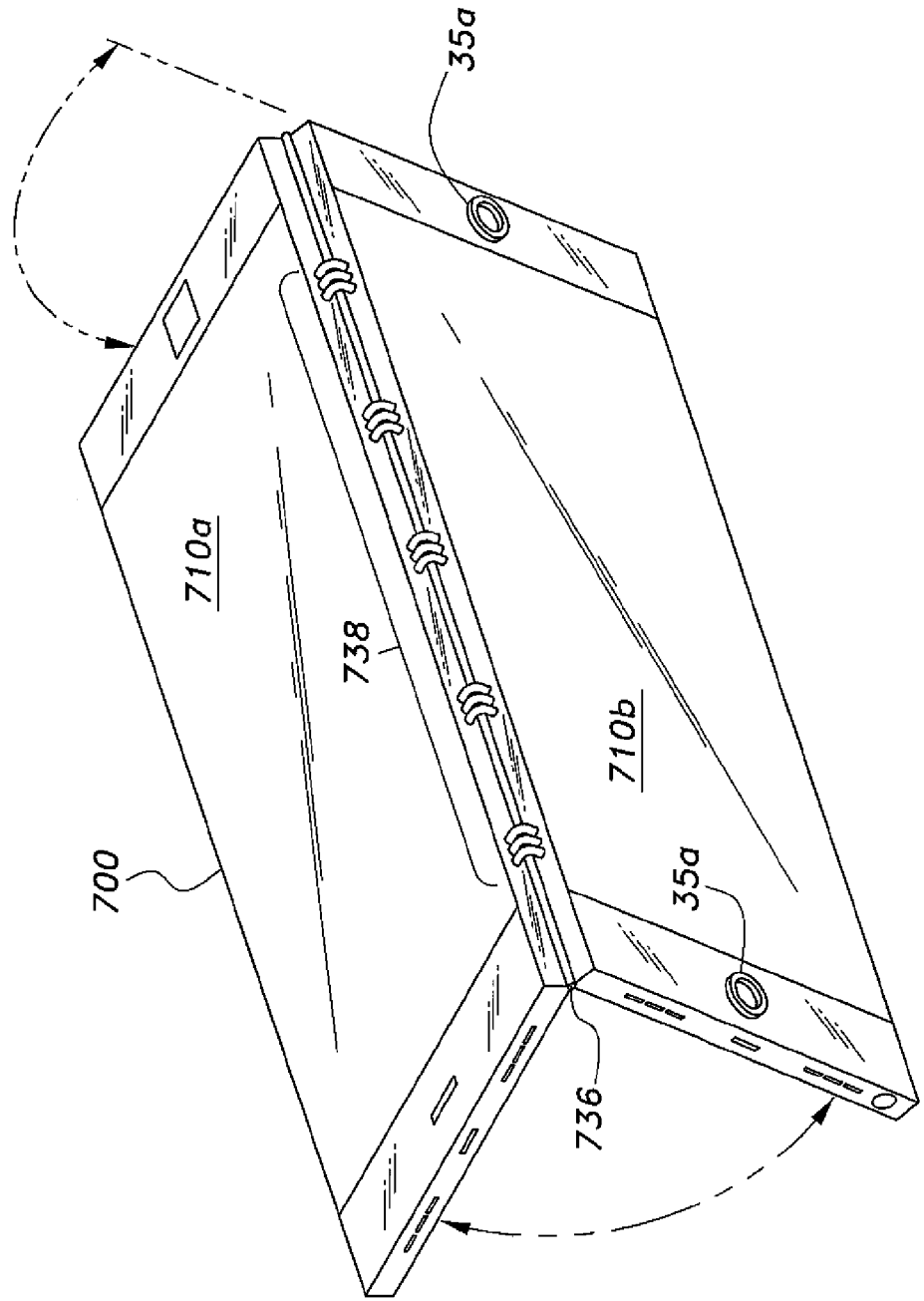
FIG. 7B is a perspective view of the expandable mobile device, showing the electrical connecting wires, according to the present invention.

FIGS. 7A and 7B depict an alternative embodiment of the expandable mobile device, designated 700. The expandable mobile device 700 can be configured to include the microprocessor and communication subsystem components of mobile devices known in the art, as discussed above with respect to the expandable mobile device 100. The expandable mobile device 700 can include a pair of display panels 710a and 710b that are hingedly connected along their side edges i.e., side-by-side. The display panels 710a and 710b can be attached to each other by a pivot hinge 736 so that the devices may be pivoted to an open, coplanar arrangement as shown in FIG. 7. A set of electrical connecting wires 738 extend between the housing of panel 710c and the housing of panel 710b to operably connect the two panels 710c and 710b for multi-display output.

Figure 8:
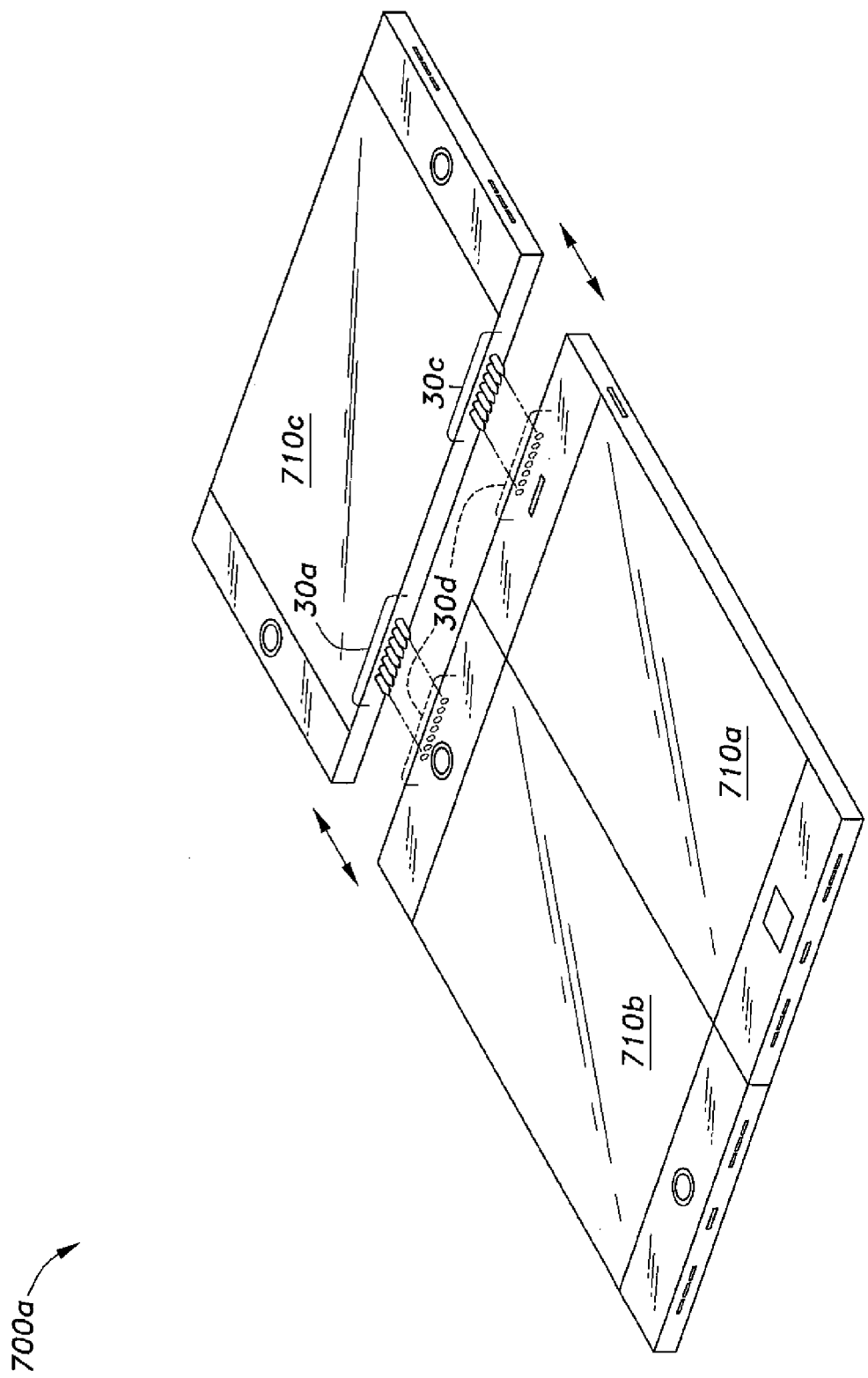
FIG. 8 is a perspective view of an embodiment in which one of the display panels can be attached to the tops of two side-by-side display panels, according to the present invention.
Figure 9A:
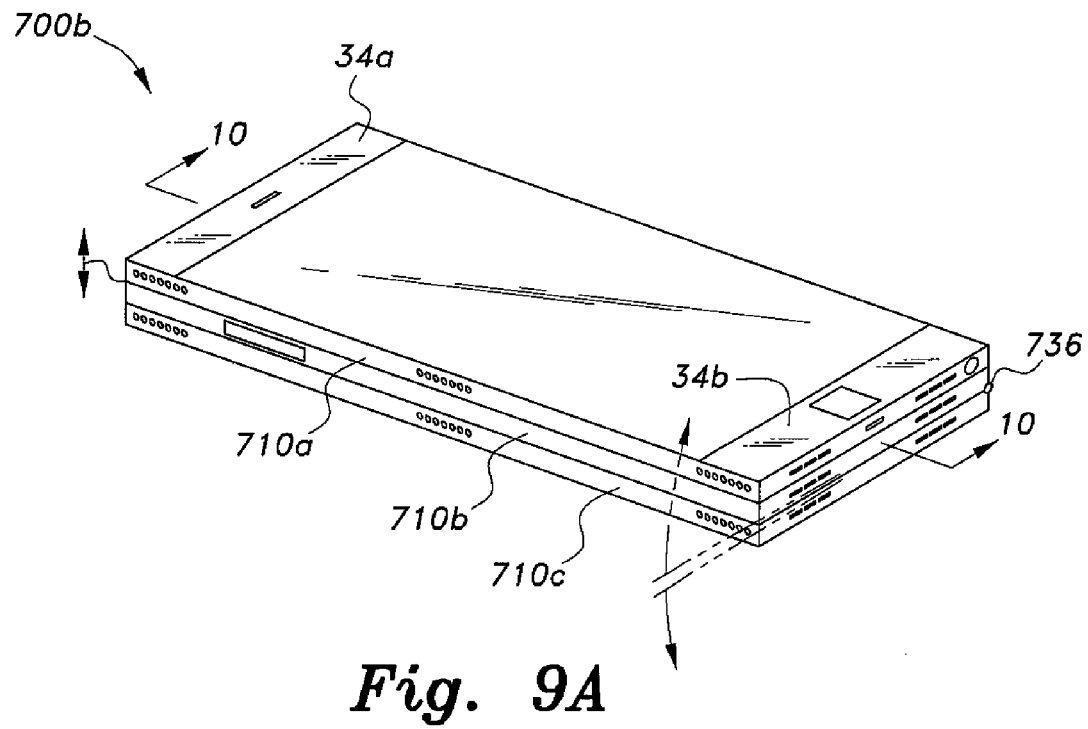
FIG. 9A is a perspective view of the embodiment of FIG. 8, showing the display panels in stacked or compact configuration, according to the present invention.
Figure 9B:
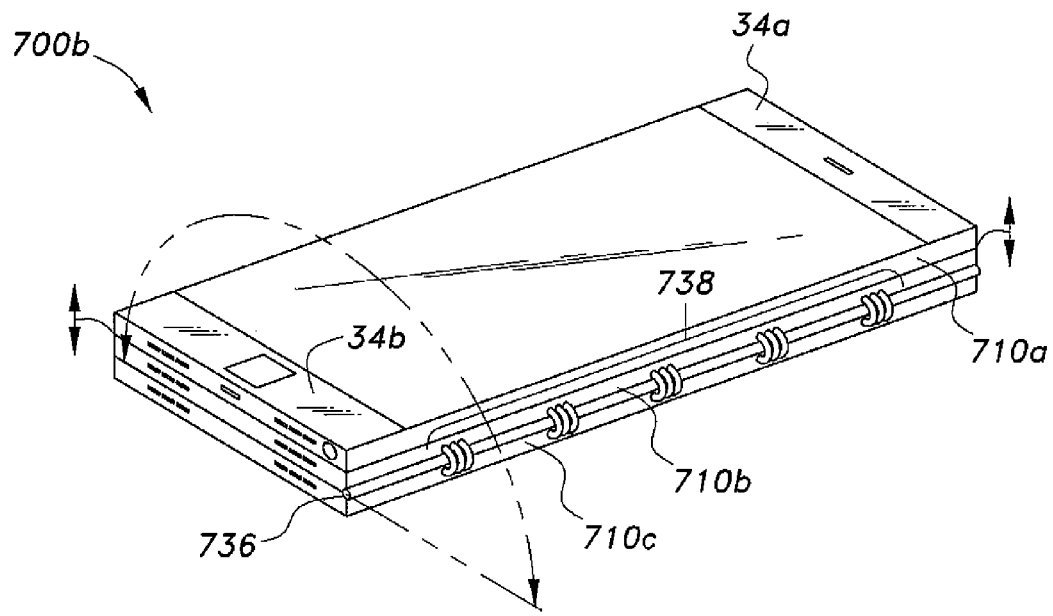
FIG. 9B is a perspective view of the embodiment of FIG. 8, showing a different perspective of the display panels in stacked or compact configuration, according to the present invention.

Referring to FIGS. 8, 9A and 9B, if desired, an additional display panel 710a can be detachably connected to the top portions of panels 710c and 710b to provide the orientation 700a, shown in FIG. 8. A first group of prongs 30a is disposed on a side of panel 710c, which mates with sockets 30d disposed on upper portion of panel 710b to provide multi-display functionality between the two electronic panels 710b and 710c. Similarly, a second group prongs 30c is disposed on the same side of panel 710c, which mates with sockets 30d disposed on upper portion of panel 710a to provide multi-display functionality between the two panels 710a and 710c. It should be understood that when the panels 710a, 710c, and 710b are all connected together, a multi-display mode can be configured to function across all of the panels 710a, 710c, and 710b. A display adapter (as previously described with respect to expandable mobile device 100) internal to at least one of the panels can combine the display operations in a single larger display, e.g. tablet, similar to the multi-screen technology used at the present for televisions and PC monitors. Further, one display screen, e.g., the display screen of panel 710c can be used to accept user input (e.g., a virtual keyboard may be provided on a touch screen) while the other two screens can be configured to provide output to the user.

The housing of the panels 710a, 710b, and 710c may be equipped with magnetic, e.g., ferromagnetic or paramagnetic surfaces in order to create a magnetic bond that can retain the devices in a narrow profile stack when the panels are not being used in the large display configuration 700a. Panels 710a, 710b, and 710c can be connected in a closed stacked arrangement as shown in FIGS. 9A and 9B. For example, as most clearly shown in FIGS. 9A and 9B, panel 710a may have a paramagnetic top portion 34a and a paramagnetic bottom portion 34b that could magnetically bond to a permanently magnetized portion of panel 710b or panel 710c. Panels 710a, 710b and 710c may be equipped with ferromagnetic and/or paramagnetic surfaces which can also be useful to create a magnetic bond that aids in retaining the panels in the large display configuration 700.

Figure 10:
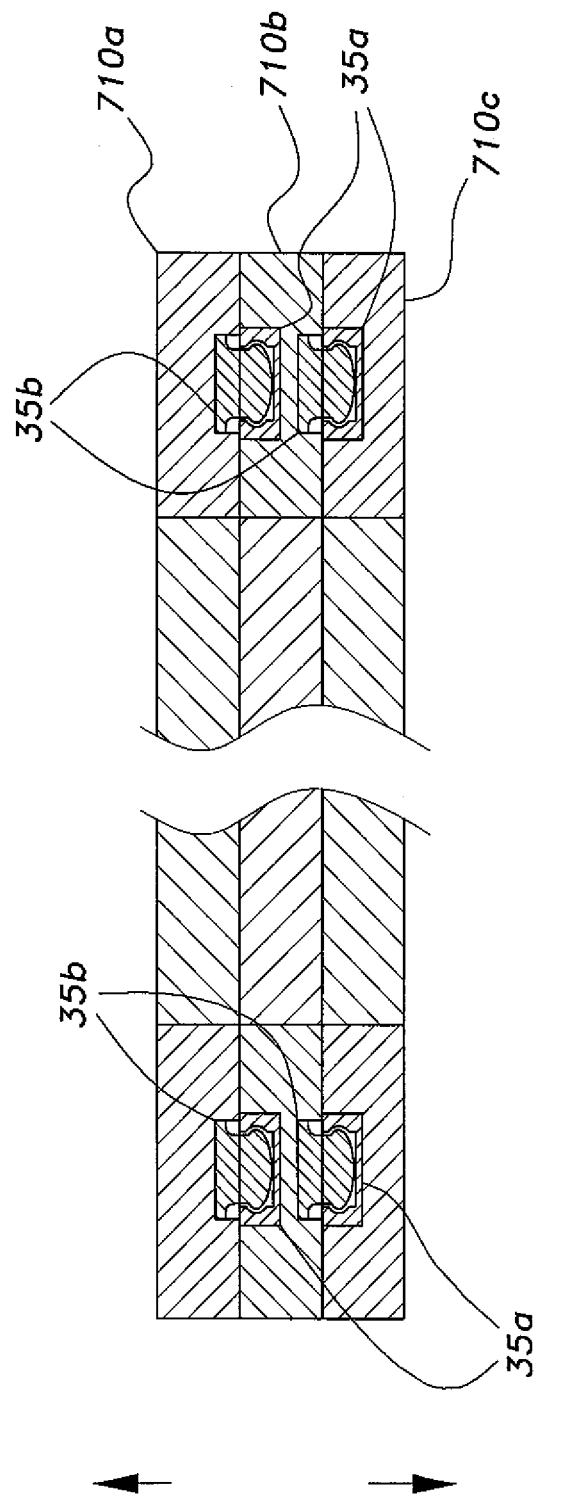
FIG. 10 is a section view as seen from line 10 of FIG. 9A, showing the snap fit connectors of the display panels, according to the present invention.

Additionally, as most clearly shown in FIG. 10, receptive snap fit members 35a and insertive snap fit members 35b can be disposed in the housing of middle panel 710b. Insertive snap fit members 35b are disposed in the housing of the top panel 710a. Receptive snap fit members 35a are disposed in the housing of bottom panel 710c. This configuration of snap fit members allows the devices to be buttoned together in a stack. The insertive snap fit members 35b snap and lock into the receptive snap fit members 35a to retain the devices 710a, 710b, and 710c in the stacked, co-aligned configuration shown.

It is to be understood that the present invention is not limited to the embodiments described above, but encompasses any and all embodiments within the scope of the following claims.

I claim:

1. An expandable mobile device, comprising:
   a first display panel in a first housing;
   a second display panel in a second housing, the second display panel being hingedly connected to the first housing;
   electrical connecting wires extending between the first display panel and the second display panel, the electrical connecting wires operably connecting the first display panel to the second display panel for providing a multi-display output;
   complementary snap fit buttons disposed on said first and second housing for retaining the first and second housing in a stacked configuration;
   a third display panel in a third housing, the third display panel including a first group of electrical connecting prongs and a second group of electrical connecting prongs, the first group of electrical connecting prongs and the second group of electrical connecting prongs being disposed on a same side of the third housing;
   a first electrical connecting socket disposed on the first housing, the first electrical connecting socket being configured for receiving the first group of electrical connecting prongs and being operable with the first group of electrical connecting prongs to provide a multi-display output; and
   a second electrical connecting socket disposed on the second housing, the second electrical connecting socket being configured for receiving the second group of electrical connecting prongs and being operable with the second group of electrical connecting prongs to provide a multi-display output.

2. The expandable mobile device according to claim 1, wherein at least the first group of electrical connecting prongs is pivotally adjustable and inwardly retractable.

3. The expandable mobile device according to claim 1, further comprising one or more magnetic materials disposed on said first and second housing, the magnetic materials forming a magnetic bond between said first housing and said second housing when connected.

4. The expandable mobile device according to claim 1, further comprising one or more magnetic materials disposed on said third housing, the magnetic materials forming magnetic bonds between the first and second housing.

* * * * *